Sept. 6, 1949.                       C. SCOTT                        2,480,884
                                 LOADING APPARATUS
                              Filed Oct. 15, 1945

CARL SCOTT
INVENTOR.

BY H. A. McGrew

ATTORNEY.

Patented Sept. 6, 1949

2,480,884

UNITED STATES PATENT OFFICE 2,480,884

LOADING APPARATUS

Carl Scott, Denver, Colo., assignor of one-half to Harry E. Menchimer, Denver, Colo.

Application October 15, 1945, Serial No. 622,256

2 Claims. (Cl. 212—37)

This invention relates to loading apparatus, and more particularly to loading apparatus which may be installed on a wheeled vehicle for transporting material or articles such as baled hay and the like.

Among the objects of this invention are to provide a loading apparatus which may be mounted on a wheeled vehicle for transporting material or articles; to provide such loading apparatus which may be operated by power derived through movement of the vehicle; to provide such loading apparatus which is readily attached to or mounted on such a vehicle; to provide such loading apparatus which may be utilized in moving a load such as baled hay from a field or the like and deposited on the loading surface of the vehicle; to provide such apparatus which may be operated by a single operator; and to provide such apparatus which is simple in construction and inexpensive to install.

Other objects and the novel features of this invention will become apparent from the following description, taken in connection with the accompanying drawing, in which.

Figure 2:
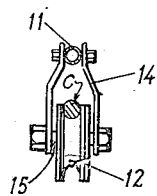
Fig. 2 is a vertical section taken along line 2—2 of Fig. 1.

The loading apparatus of this invention, which may be installed on a wheeled vehicle V, includes a boom B formed by a tubular vertical shaft 10, the end of which is bent over to form an overhanging arm 11. Pulleys 12 and 13 are suspended from the arm 11, respectively adjacent the outer end thereof and adjacent shaft 10, by brackets 14 which may be attached to arm 11 in a suitable manner, as by cap screws, as shown in Fig. 2. Each pulley 12 and 13 rotates on a horizontal bolt 15 supported by bracket 14 at the lower end thereof. Boom B is pivotally mounted on the vehicle, as by a bracket 16, attached to the bed or framework 17 of the vehicle V on the underside thereof, and supporting a bearing socket 18, which forms a lower bearing and support for the lower end of shaft 10. The boom support also includes a guide or bearing tube 19 through which shaft 10 extends, tube 19 extending from cap 18 through a loading platform 20, which provides a loading surface, to a point sufficiently high on shaft 10 to permit the boom to carry relatively heavy loads and to be swung about to any desired position. Tube 19 is attached to framework 17 of the vehicle in a suitable manner as by clamps 21, while shaft 10 is provided with a collar 22 which may be adjusted against the upper end of tube 19 so as to take some of the downward thrust due to a load on the boom. The boom is completed by a brace 23 which extends angularly from shaft 10, at a point just above collar 22, to a point midway of overhanging arm 11, between pulleys 12 and 13.

Figure 3:
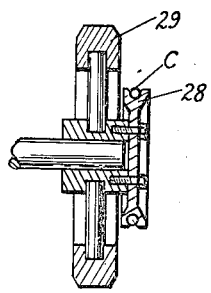
Fig. 3 is a vertical section taken along line 3—3 of Fig. 1.

A cable C, which may be a wire or manila rope, or any other suitable hoisting line, is utilized in raising and lowering loads mounted on a hook 24 attached to the depending or boom end 25 of the cable. Also, a lower pulley 26 is mounted on a bracket 27 for rotation about a horizontal axis, adjacent but exteriorly of loading platform 20. Cable C passes over pulleys 12 and 13, and then down alongside tube 19 to lower pulley 26. The cable then passes beneath, or around and beneath, pulley 26 and down to a drive pulley 28, which is attached to a wheel 29 of the vehicle V in a suitable manner, as by bolting in the manner shown in Fig. 3. After passing beneath and around drive pulley 28, the cable passes upwardly and over lower pulley 26, around which one or more turns of the cable may be taken if desired.

Figure 1:
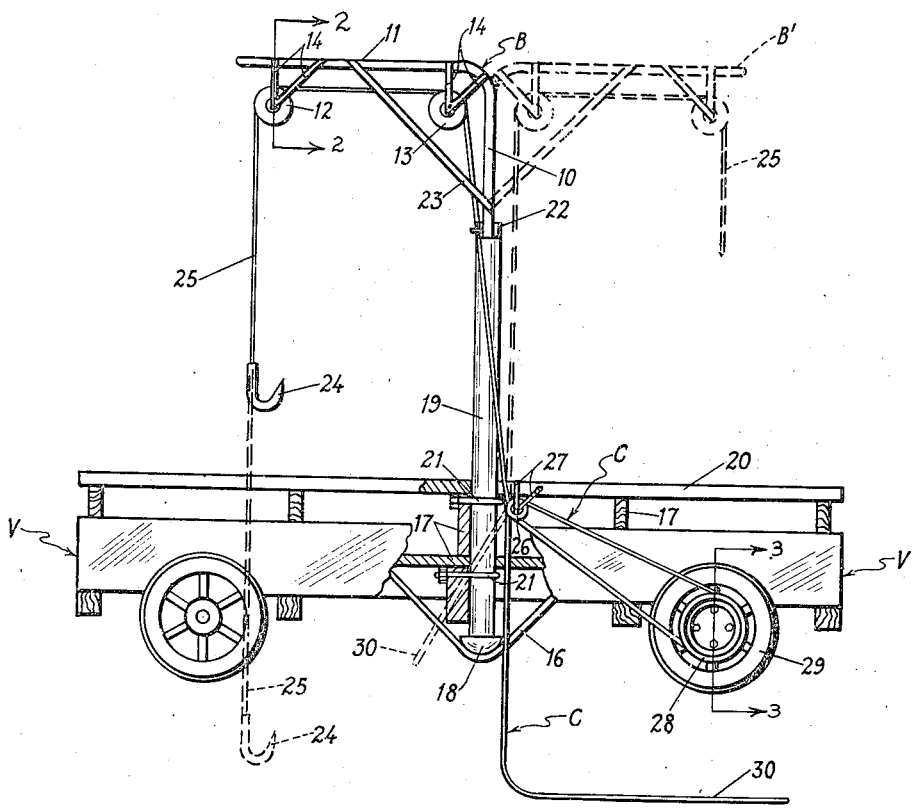
Fig. 1 is a side elevation of loading apparatus, constructed in accordance with this invention and installed on a wheeled vehicle adapted to transport material, a portion of the vehicle being broken away to show the construction and installation of the loading apparatus.

When the hook 24 is lowered to the dotted position of Fig. 1 with the vehicle stopped, a load such as a bale of hay may be attached to the hook. The vehicle—which may be horse or tractor drawn, or may be a self-propelled vehicle such as a truck—is then started up. Simultaneously, the operators pulls on the free end 30 of cable C, whereupon the cable assumes generally the position in which it is shown in dotted lines in Fig. 1. This tightens the cable about drive pulley 28, and due to the forward motion of the vehicle the load (not shown) is soon raised, with hook 24 moving from its broken line position to its full line position in Fig. 1. Thereupon, the vehicle may be stopped, and the boom B swung around to the dotted position B', whereupon the tension on the free end of the rope may be relieved, to a lesser or greater degree in accordance with the weight of the load, so that the cable will slip over lower pulley 26 and drive pulley 28, to lower the load on to platform 20. Thereupon, the load may be released, and the boom B swung back again to a position ready to receive the next load.

As will be evident, when the vehicle is being moved from the field to a barn or the like, or when the loading apparatus is not being used for a relatively long period of time during movement of the vehicle, the free end 30 of the cable may be removed from drive pulley 28 and thrown upon platform 20, or the load carried by the platform. Also, the boom may be swung out of the way, such as over the platform, during such movement. During relatively short periods of movement between loads, the cable may be left around the drive pulley as long as tension is not produced on the free end of the cable.

The boom B is preferably mounted adjacent one side of the vehicle, both to afford a greater range of reach outside the vehicle, and also to permit a direct passage of the cable between the arm pulleys 12 and 13 and the lower pulley 26. It will be understood, of course, that the loading apparatus may be used for unloading purposes, although loading is usually sufficient, and that it may be utilized in loading or unloading any other type of material or articles, such as bales, boxes and the like.

From the foregoing, it will be apparent that the loading apparatus of this invention fulfills to a marked degree the objects hereinbefore set forth. The simplicity of installation of the loading apparatus is evident, and the mere attachment of a drive pulley to one of the wheels of the vehicle further simplifies the installation. The lower end of shaft 10 of the boom B extends sufficiently below the loading platform, by virtue of bracket 16 and cap 18 forming a support therefor underneath the vehicle, and guide tube 19 also extends for a considerable distance along the shaft, so that the boom readily supports the load thereon and stresses due to imposition of the load are adequately transmitted to the framework of the vehicle.

It will be understood that embodiments of this invention other than that described may exist, and that various changes may be made in the loading apparatus, particularly in the manner of its attachment to the vehicle, without departing from the spirit and scope of this invention.

What is claimed is:

1. Loading apparatus for a wheeled vehicle adapted to transport material on a loading surface of said vehicle, comprising a pivoted boom having an upright portion and an overhanging portion disposed substantially at a right angle to the upright portion, a pulley mounted on and adjacent the outer end of said overhanging portion and adapted to receive a cable passing thereover, a lower pulley mounted on a shaft secured to said vehicle below said loading surface and extending laterally from said vehicle beyond said loading surface, a drive pulley attached to a wheel of said vehicle in operative relation with said lower pulley, and a support for said boom including a guide extending through said loading surface, a cap beneath said boom and forming a lower bearing support therefor, and a bracket attached to said vehicle beneath said loading surface for supporting said cap.

2. In a loading apparatus, the combination of a plurality of wheels, a framework mounted on said wheels, a loading platform mounted on said framework, a bearing tube extending vertically through said platform and rigidly clamped to said framework, a bearing socket supported by and below said framework, a vertical shaft extending through said bearing tube, said tube and said shaft resting in said socket, a collar adjustably secured to said shaft and bearing on the upper end of said bearing tube, a horizontal arm extending outwardly from the upper end of said vertical shaft, a plurality of pulleys mounted on and below said arm, a shaft mounted on said vehicle between said bearing socket and one of said wheels, said shaft extending outwardly of and below said platform, a lower pulley mounted on the outer end of said shaft, a pulley mounted on said one of said wheels and a hoisting line operatively arranged on said pulleys.

CARL SCOTT.

REFERENCES CITED

The following references are of record in the file of this patent:

UNITED STATES PATENTS

| Number | Name | Date |
|---|---|---|
| 54,936 | Miller | May 22, 1866 |
| 64,482 | Bullis | May 7, 1867 |
| 78,566 | Barker | June 2, 1868 |
| 322,618 | Lathrop | July 21, 1885 |
| 358,558 | Lathrop | Mar. 1, 1887 |
| 500,328 | Hays | June 27, 1893 |
| 546,088 | Clancy et al. | Sept. 10, 1895 |
| 754,586 | Maxwell | Mar. 15, 1904 |
| 824,025 | Johnson | June 19, 1906 |
| 841,404 | Jay | Jan. 15, 1907 |
| 889,054 | Smith et al. | May 26, 1908 |
| 953,962 | Lane | Apr. 5, 1910 |
| 1,453,552 | Fuller et al. | May 1, 1923 |
| 1,732,191 | Evans | Oct. 15, 1929 |
| 2,342,942 | Johnston | Feb. 29, 1944 |